United States Patent
Büttner et al.

(10) Patent No.: US 12,395,049 B2
(45) Date of Patent: Aug. 19, 2025

(54) METHOD FOR PRODUCING A SQUIRREL-CAGE ROTOR OF AN ASYNCHRONOUS MACHINE

(71) Applicant: Innomotics GmbH, Nuremberg (DE)

(72) Inventors: Klaus Büttner, Hollstadt (DE); Klaus Kirchner, Ostheim (DE); Matthias Warmuth, Windshausen (DE)

(73) Assignee: Innomotics GmbH, Nuremberg (DE)

( * ) Notice: Subject to any disclaimer, the term of this patent is extended or adjusted under 35 U.S.C. 154(b) by 779 days.

(21) Appl. No.: 17/630,058

(22) PCT Filed: Jul. 17, 2020

(86) PCT No.: PCT/EP2020/070267
§ 371 (c)(1),
(2) Date: Jan. 25, 2022

(87) PCT Pub. No.: WO2021/032379
PCT Pub. Date: Feb. 25, 2021

(65) Prior Publication Data
US 2022/0320975 A1    Oct. 6, 2022

(30) Foreign Application Priority Data

Aug. 16, 2019 (EP) ................................. 19192098

(51) Int. Cl.
*H02K 15/023* (2025.01)
*H02K 17/20* (2006.01)

(52) U.S. Cl.
CPC ........... *H02K 15/023* (2025.01); *H02K 17/20* (2013.01)

(58) Field of Classification Search
CPC ........... H02K 15/0012; H02K 2213/03; H02K 17/20; H02K 15/02; H02K 15/12; H02K 17/16
See application file for complete search history.

(56) References Cited

U.S. PATENT DOCUMENTS 3,134,040 A * 5/1964 Barth ..................... H02K 17/20
                                                    310/211
6,088,906 A    7/2000 Hsu et al.
(Continued)

FOREIGN PATENT DOCUMENTS

CN    102136783 A    7/2011
CN    102386723 A    3/2012
(Continued)

OTHER PUBLICATIONS

PCT International Search Report and Written Opinion of International Searching Authority mailed Jun. 10, 2020 corresponding to PCT International Application No. PCT/EP2020/070267 filed Jul. 17, 2020.

*Primary Examiner* — Tulsidas C Patel
*Assistant Examiner* — Riley Owen Stout
(74) *Attorney, Agent, or Firm* — Henry M. Feiereisen LLC

(57) ABSTRACT

In a method for producing a squirrel-cage rotor of an asynchronous machine, conductor bars of a first conductive material are inserted into slots of a magnetically conductive body such as to project out of at least one end side to form a projection. A short-circuiting disc of a second conductive material is positioned under pressure on the projection with a clearance fit of approximately 0.1 mm relative to a radially outwardly open recess of the short-circuiting disc. The short-circuiting disc is heated while the conductor bars virtually contact the short-circuiting disc. At least the projection of the conductor bars is coated with a third material at a layer thickness to form an alloy with the first and second materials after heating so that the third material is fully dispersed in the first and second materials as a result of the third material being diffused into the first and second materials.

27 Claims, 8 Drawing Sheets

(56) References Cited

U.S. PATENT DOCUMENTS

| | | |
|---|---|---|
| 6,159,305 A | 12/2000 | Kliman et al. |
| 2003/0184184 A1 | 10/2003 | Lawrence |
| 2004/0139596 A1 | 7/2004 | Hsu |
| 2011/0175484 A1* | 7/2011 | Wang .................... H02K 17/18 29/598 |
| 2012/0049687 A1 | 3/2012 | Osborne et al. |
| 2012/0159772 A1 | 6/2012 | Kleber et al. |
| 2012/0228985 A1 | 9/2012 | Hayahi et al. |
| 2013/0049518 A1* | 2/2013 | Kleber ............... H02K 15/0012 29/598 |
| 2013/0127291 A1 | 5/2013 | Agapiou et al. |
| 2013/0291373 A1 | 11/2013 | Meyer et al. |
| 2014/0167554 A1* | 6/2014 | Oshida .................. H02K 17/20 310/211 |
| 2015/0303781 A1* | 10/2015 | Brandl .................. H02K 17/20 29/598 |
| 2016/0141944 A1 | 5/2016 | Berger et al. |
| 2016/0352200 A1* | 12/2016 | Kaneda .................. H02K 17/16 |
| 2016/0359399 A1 | 12/2016 | Spry |
| 2018/0269761 A1 | 9/2018 | Ulbrich et al. |
| 2019/0115809 A1 | 4/2019 | Peng |
| 2020/0083786 A1 | 3/2020 | Büttner et al. |
| 2021/0036587 A1* | 2/2021 | Brandl ............... H02K 15/0012 |
| 2021/0044189 A1 | 2/2021 | Muller et al. |

FOREIGN PATENT DOCUMENTS

| | | |
|---|---|---|
| CN | 102684435 A | 9/2012 |
| CN | 204206894 U | 3/2015 |
| CN | 106253513 A | 12/2016 |
| CN | 107508393 A | 12/2017 |
| CN | 108110922 A | 6/2018 |
| CN | 108352770 A | 7/2018 |
| DE | 34 13 519 C2 | 6/1986 |
| DE | 10 2013 211 040 A1 | 12/2014 |
| EP | 2 660 958 A2 | 11/2013 |
| EP | 3 402 057 A1 | 11/2018 |
| EP | 3 518 398 A1 | 7/2019 |
| JP | 2002336669 A | 11/2002 |
| JP | 2010120034 A | 6/2010 |
| JP | 2012170202 A | 9/2012 |
| KR | 101098303 B1 | 12/2011 |

* cited by examiner

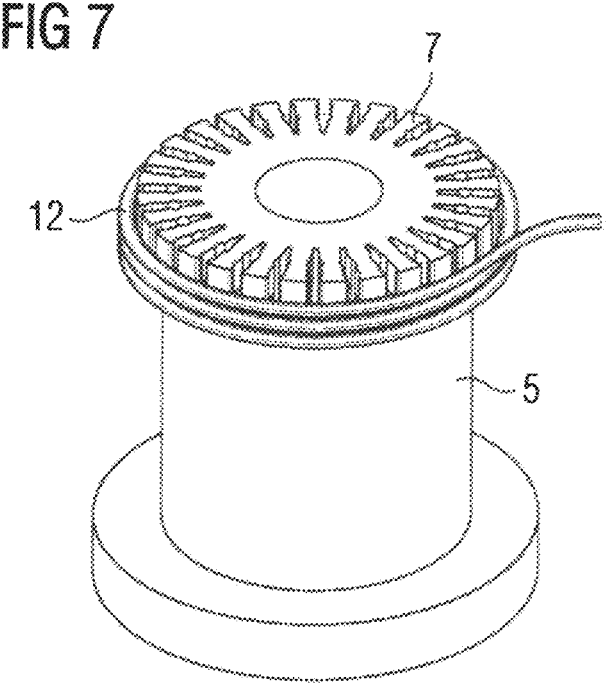
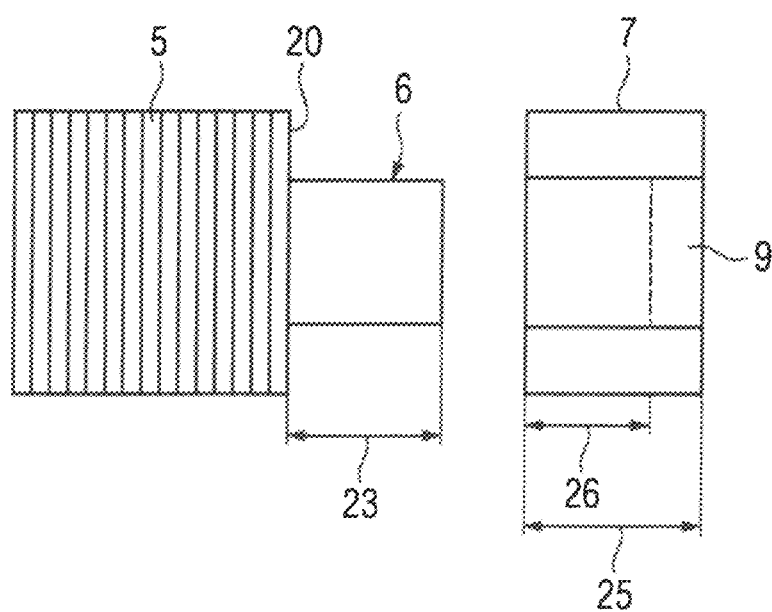

METHOD FOR PRODUCING A SQUIRREL-CAGE ROTOR OF AN ASYNCHRONOUS MACHINE

CROSS-REFERENCES TO RELATED APPLICATIONS

This application is the U.S. National Stage of International Application No. PCT/EP2020/070267, filed Jul. 17, 2020, which designated the United States and has been published as International Publication No. WO 2021/032379 A1 and which claims the priority of European Patent Application, Serial No. 19192098.2, filed Aug. 16, 2019, pursuant to 35 U.S.C. 119 (a)-(d).

BACKGROUND OF THE INVENTION

The invention relates to a method for producing a squirrel-cage rotor of an asynchronous machine, to the asynchronous machine itself and to the use thereof in different preferably industrial applications.

Squirrel-cage rotors of dynamo-electric rotary machines are produced in a work cycle using pressure diecasting techniques in the lower power range. This material-fit method is cost intensive because the dies are expensive and wear comparatively quickly. Moreover, during production, a comparatively high degree of variability is present in the quality of a squirrel-cage rotor produced thus. This can be seen in e.g. the change of quality of the melt in the crucible, impurities of the melt during the casting process, mold release or abrasion in the tool, and the formation of voids or stress cracks during cooling of the cast part.

In the higher power range or in special applications of dynamo-electric rotary machines, individual conductor bars are electrically and mechanically connected to a short-circuiting ring. This is achieved e.g. by means of soldering or welding operations as described inter alia in DE 34 13 519 C2.

It is however disadvantageous in the case of these larger dynamo-electric machines that short-circuiting rings are provided with a circumferential solder tank which has to be completely filled with solder for the soldering process. In this case, only the volume corresponding to the volume of the conductor bars projecting into the solder tank is not filled with solder. Owing to the high silver content in the solder, inter alia production of the solder connection between conductor bars and short-circuiting ring is not particularly effective in economical terms.

In order to eliminate the quality deficiencies, which also occur in the low power range, the diecasting operation is performed using e.g. a shielding gas. Provision is also made for tools having multiple venting means, or even for modifying the alloy of the melt. These interventions make it possible to increase the efficiency of the asynchronous squirrel-cage rotor, but additional measures are nonetheless required for strength, said measures being suitable in particular for high rotational speeds, e.g. reinforcing rings for achieving higher levels of strength.

US 2013/0291373 A1 discloses a resistance welding method in which short-circuiting rings are connected to the conductor bars by means of resistance welding. It is disadvantageous in this case that, as the number of conductor bars welded to the short-circuiting ring increases, the current flows via the previously produced joints and therefore significantly hampers the resistance welding of the remaining bars to the short-circuiting ring. The welding of all conductor bars in a single operation is laborious and inter alia very costly in terms of energy.

With reference to the above, the object of the invention is to provide a method for producing a squirrel-cage rotor of an asynchronous machine, giving priority to both the electrical properties and the economical nature of the production method. It is further intended that a more efficient connection of conductor bars to short-circuiting rings should be easy and effective to produce.

SUMMARY OF THE INVENTION

The object of the invention is achieved by a method for producing a squirrel-cage rotor of an asynchronous machine by way of the following steps:
providing a substantially cylindrically shaped magnetically conductive body, in particular a laminated rotor core, having substantially axially running slots,
inserting conductor bars composed of a first conductive material into the slots in such a way that the conductor bars project out of the end sides of the magnetically conductive body, in particular the laminated rotor core, and thereby form at least one projection on one side, in particular a projection on both sides in each case,
providing a short-circuiting disc composed of a second conductive material, with recesses which are open radially to the outside,
axially positioning at least one short-circuiting disc on the projections of the respective conductor bars which project out of the end side of the magnetically conductive body, in particular the laminated rotor core,
subsequently heating, in particular hot-forming, the axially pushed-on short-circuiting disc, while an almost simultaneous contacting of the conductor bars with at least one short-circuiting disc is effected.

The object set is also achieved by an asynchronous machine having a squirrel-cage rotor that is produced in accordance with the inventive method.

The object set is also achieved by a drive system which, using at least one asynchronous machine according to the invention, drives compressors, conveyor systems, machine tools or vehicles in particular.

According to the invention, first the magnetically conductive body is provided, i.e. sintered material or an at least partially 3D-printed body or individual laminations are stacked, bonded and/or batch-stamped to form a complete laminated rotor core.

Into the available slots of this magnetically conductive body of the rotor, irrespective of any cant in the slot, are inserted conductor bars composed of a first electrically conductive material, e.g. drawn copper bars. The slots are situated in the radially outer region of the magnetically conductive body and are designed to be peripherally closed, half-open or open in each case.

Before insertion into the magnetically conductive body, said conductor bars are provided with a coating after pickling, preferably immediately after pickling of the conductor bars, completely or at least in the region of their specifiable projection, in order to prevent the formation of an oxidization layer on the pickled conductor bar. That section of the conductor bar which projects out of the end side of the magnetically conductive body is referred to as a projection in this case.

The coating is preferably electroplated to between 2 µm and 5 µm in order to optimize the process of diffusion into the first and second material as described below.

Alternatively, the coating can also be sprayed on, though the selected layer thicknesses are then subject to greater tolerance.

This third material, i.e. the coating, is preferably composed of tin since with the first and second materials in the context of this manufacturing process this produces a comparatively highly conductive electrical connection between said first and second material.

In order to precisely fix the conductor bars in the magnetically conductive body at the precise position and for the subsequent process of connection to the short-circuiting discs without any imbalance occurring in the rotor, the conductor bars can be held in position by means of a corresponding retaining device, e.g. a matrix etc.

The ends of the conductor bars projecting out of the magnetically conductive body, i.e. the projections, are at least for the most part connected in an electrically conductive manner to the short-circuiting disc, this being preferably composed of aluminum or an aluminum alloy, thereby creating a short-circuiting cage of the rotor of the asynchronous machine, i.e. the squirrel-cage rotor.

These short-circuiting discs are obtained from an extruded profile in this case, in particular a cylindrical profile. These discs can be configured in respect of their axial height in this case, this being achieved by means of cutting a respective disc off from the profile.

The short-circuiting disc or short-circuiting disc segments are therefore preferably produced by extrusion of the second material followed by cutting to length. In this case, the cut-outs embodied in the radially outer region of the short-circuiting disc can be peripherally closed, half-open or open. In the case of closed and half-open cut-outs, the conductor bars must be inserted axially. In the case of open cut-outs, the conductor bars can also be introduced into the short-circuiting disc radially, this being an alternative in particular in the case of segmented short-circuiting discs and/or open slots in the laminated core of the rotor.

The short-circuiting disc advantageously has prefabricated recesses for the conductor bars, this being easy to realize using extrusion technology. In this case, the geometric cross section of the prescribed cut-outs is slightly larger than the geometric cross section of a conductor bar, in order to allow a clearance fit between conductor bar and short-circuiting disc.

Alternatively, the short-circuiting discs can also be circumferentially and/or axially segmented. This allows economical production of a squirrel-cage rotor, in particular also for asynchronous machines having greater shaft heights.

This connection or electrical contacting between the coated projection of the conductor bars and the short-circuiting discs, in particular in the region of a contact area, is inventively effected by means of heating, in particular hot-forming of this region, in particular inductive hot-forming.

Hot-forming in this case refers to forming which takes place above the recrystallization temperature of a metal, in particular of the first and/or second material. Recrystallization describes the reduction of lattice defects in the metal crystals by reforming the structure as a result of nucleation and grain growth.

During the hot-forming process, the short-circuiting disc is heated to approximately 450° C. to 500° C.

This hot-forming is effected by means of an inductor and a press, wherein the inductor can easily be adjusted to different diameters and/or heights of the short-circuiting disc. The inductor advantageously has a screen which acts in the direction of the laminated core in order to prevent unnecessary heating of the end sides of the laminated core and possibly changing the material properties of these laminations. This is important primarily in the case of short-circuiting discs which are directly in contact with the end sides of the laminated core, i.e. not arranged at a distance. Such screening of the inductor is also clearly beneficial in the case of short-circuiting discs which are arranged at a distance from the end side of the laminated core.

The heating and the pressing take place serially, i.e. one after the other relative to time. The process can however also start with the heating, wherein the pressing operation can already start in the final phase of the heating.

In order to reach the required temperature for the hot-forming, the short-circuiting discs can also be at least preheated by other means, in particular in a furnace. The pressing then takes place after the short-circuiting discs are placed onto the projections.

The coating composed of the third material in this case melts on the projection of the conductor bar, in particular on the projection of the copper bar copper bar. As a result of the comparatively thin layer thickness of the coating on the projection combined with the surface tension, the molten coating on the projection of the conductor bar starts a process which is manifested as a reflow process of the coating to the conductor bar.

The projection refers in this case to that part of the conductor bars which projects axially out of the magnetically conductive body, in particular the laminated rotor core. The contact with the short-circuiting disc is effected axially and/or peripherally on a section of the projection or on the whole projection. The projection therefore has a section which comprises an area of contact with the short-circuiting disc, wherein the coating also disperses at said contact area. This contact area is formed by the insertion depth of the projection into the short-circuiting disc and the recess of the short-circuiting disc, said recess surrounding the projection closely with little clearance.

In addition, the heated short-circuiting disc is subjected to a force on its end side which is oriented away from the laminated core, and is formed onto the conductor bars, in particular onto the projections or those sections of the projections which are intended for this purpose. This results in a highly conductive electrical connection between the conductor bar and the short-circuiting ring.

As a result of axial placement of the short-circuiting disc onto the conductor bars or the conductor bars onto the short-circuiting ring disc or reciprocal axial placement, the conductor bar/bars and short-circuiting disc with corresponding recesses move towards each other respectively.

The gaps which initially exist at least between projection and recesses of the short-circuiting discs (clearance fit) in the case of cold joining (temperature range between room temperature and a maximum of 100° C.) are no longer present after the process. With cold joining, almost no friction and/or deformation occurs between the conductor bars and the short-circuiting discs. The hot-forming causes at least the gaps of the clearance fit to close. As a result of the heating, in particular the hot-forming temperatures, there also occurs a reflow process of the coating to the short-circuiting disc. The coating composed of the third material disperses completely. The coating material, in particular tin, diffuses into the surfaces in the region of the specifiable section of the projection of the conductor bar and the surface that is to be contacted in the recess of the short-circuiting disc. Therefore the desired contacting occurs only where the clearance fit was present between projection and recess, i.e. the desired contact area.

The complete dispersal of this coating during the production process (diffusion) in the region of the contact areas is essential for the quality of the contacting between conductor bar and short-circuiting disc. As a result of the complete dispersal, accumulations of the coating material are no longer present in the gap. In the case of specific materials such as e.g. tin, in a temperature range of approximately −40° C. to 200° C. when running the asynchronous machine, unwanted transformations of beta tin into alpha tin or gamma tin would otherwise occur. This would result in tin grain with a comparatively poor electrical conductance. The contacting between conductor bar and short-circuiting disc would then be comparatively poor, and this would lead to unnecessary thermal increases during operation and to a diminished efficiency of the asynchronous machine.

As a result of this diffusion and alloying, in particular of the tin into the first and second conductive materials of conductor bar and short-circuiting disc, e.g. copper and aluminum or alloys thereof, the previously described phase transformation of the coating material is prevented.

By virtue of the reflow and diffusion processes, a material-fit connection between conductor bars and short-circuiting disc is achieved without the application of current as used in the production of a squirrel-cage rotor by means of resistance welding.

In addition to the inter alia electrical connection that is produced by forming, an additional material-fit connection is also obtained by means of diffusion.

In this case, it is essential that the melting point of the third material, i.e. the coating, is lower than the heating temperature of the hot-forming at the short-circuiting disc composed of the second electrically conductive material.

The short-circuiting disc is embodied as a hollow cylinder in geometrical terms, with recesses which are open radially to the outside.

The inventive idea can however also be implemented with recesses which are radially closed, though this may require further manufacturing steps.

By means of applying an axial joining force, it is possible simultaneously to compress and compact the magnetically conductive body, in particular the stacked laminated core, in an axial direction. Once the joining operation described above is complete, the laminated core remains under tension since the conductor bars are connected to the short-circuiting discs at the end sides of the rotor with a material fit. Any additional positive fit is therefore unnecessary. Any looseness of the conductor bars in the slot of the magnetically conductive body is also prevented thereby.

It is advantageous for the production method, particularly in the case of axially thicker or higher short-circuiting discs, if a temperature gradient is obtained in the heating operation, i.e. during the hot-forming, specifically a temperature drop starting from that end side of the short-circuiting disc which is oriented towards the laminated core and continuing axially outwards.

In this way, the temperature remains higher in the region of that side of the short-circuiting disc which is oriented towards the laminated core, such that the first deformation occurs in the form of an upsetting deformation at the locating face. The further upsetting generates frictional heat which continues axially outwards. It is thereby possible to avoid thermal overload of the material and to effect the deformation in a planar manner axially outwards from the inside.

This method can also be referred to as a reverse rivet fastening, since instead of the bar being expanded (riveted) the short-circuiting disc is formed onto the conductor bar. It is therefore comparatively easy to incorporate positive fits in the joint, since it is easier to introduce contours into the conductor bar, in particular into the projection, than it is to lock into the geometry of the recesses of the short-circuiting disc.

The conductor bar or the projection does not occupy the total axial length or height of the short-circuiting disc in this case.

If the conductor bar does not occupy the whole contour of the primarily open or half-open cut-out, the radially outer part of the recess acts as a ventilator.

Additionally or optionally, the projection of the conductor bars can of course also project axially beyond the short-circuiting disc and thus assume a ventilator function.

The wrought alloys are generally material compositions which exhibit a high degree of ductility (plastic deformability) and are consequently ideally suitable for hot-forming, i.e. high degrees of deformation are possible with comparatively low expenditure of force.

Copper bars composed of oxygen-free drawn electrocopper with a conductance of approximately 58 MS/m are preferably used as conductor bars.

Al wrought alloys are preferably used for short-circuiting discs, since these are ideally suitable for hot-forming, since the required force for deformation is comparatively low for a relatively high deforming capability. Therefore e.g. the materials EN AW 6082 or EN AW 6060 are used.

If e.g. an Al alloy disc is used, i.e. a short-circuiting ring disc composed of an Al wrought alloy, the temperatures are in the region of 500° C. In the case of a copper alloy, these temperatures are approximately 800° C. The form change speed of the material will differ with different materials.

Reference values for Al alloys of the short-circuiting discs in this case are a temperature range of approximately 400° C. to 500° C., a form change in the region of 0.5 and a form change speed of 1 to 4 1/s.

In order to increase the efficiency and rotational speed capability of the squirrel-cage rotor that is produced, it is additionally possible to apply a supplementary heat treatment subsequently. As a result of this subsequent heat treatment or so-called tempering, the mechanical and electrical material properties such as tensile strength and electrical conductivity can be increased further. The strength increases due to the formation of finely dispersed precipitates as a result of the tempering. This precipitation preferably takes place at moderate temperatures of approximately 140° C. to 190° C., which is also referred to as artificial aging.

It is thereby possible positively to influence e.g. tensile strength and electrical conductivity of the individual components and also of the complete cage of the squirrel-cage rotor.

For example, in the case of the material EN AW 6060, 10-hour tempering at 185° C. achieves an increase in proof stress from 80 N/mm$^2$ to approximately 200 N/mm$^2$. The electrical conductivity of the short-circuiting ring can also be increased from 28 MS/m to 34 MS/m, since a reduction of the stresses in the lattice occurs during the heat treatment.

Said heat treatment is effected e.g. by means of solution heat treatment followed by quenching. The stress in the lattice is thus reduced and "frozen". The lower the stress in the lattice, the better the electrical conductivity.

The proof stress of the short-circuiting ring obtained thus is higher by a factor of 10 than the proof stress of pressure-cast short-circuiting rings using Al 99.6. Therefore higher rotational speeds of the rotor of an asynchronous machine are possible, e.g. without additional bandaging on the short-circuiting ring.

If stress is applied to a ductile material below the proof stress (also referred to as Rp 0.2 proof stress), said material re-forms to its original state when the stress is removed. In the stress is higher, plastic deformation takes place. When a rotor is subjected to a high rotational speed, the centrifugal force acts on the short-circuiting ring. The higher the proof stress, the greater the protection against plastic deformation of the short-circuiting ring.

The value of the proof stress, which is higher than that of pure aluminum, can be increased further by means of appropriate subsequent heat treatment.

For example, the proof stress of Al 99.6 is approximately 20 N/mm$^2$ while the proof stress of AlMgSi (EN AW 6060) after heat treatment is approximately 200 N/mm$^2$.

In a further embodiment of the invention, e.g. the short-circuiting discs are equipped with a closed outer radial contour composed of steel or other material of higher tensile strength or proof stress in order to achieve even higher rotational speeds using an asynchronous machine.

A short-circuiting disc composed of aluminum has a low moment of inertia and therefore a higher rotational speed capability by virtue of its low mass compared with copper short-circuiting discs.

According to the invention, a material-fit connection is now produced for the contacting between conductor bar and short-circuiting disc, without use of pressure diecasting and welding methods such as resistance welding, friction stir welding or laser welding.

Conductor bars are provided, in particular copper bars with a coating at least on the projection. Pure aluminum or a ductile wrought alloy of aluminum is used as a short-circuiting disc. The short-circuiting disc is brought up to temperature and subsequently, or at least for a time in parallel, formed and optionally held at temperature. A diffusion and material-fit connection/contacting between the projection of the conductor bar and short-circuiting disc are obtained thereby.

Both the drawn copper bars and the extruded short-circuiting discs are free from voids, cracks, and impurities.

The machinery required to produce a cage of a squirrel-cage rotor of an asynchronous machine is reduced to pressing and induction equipment.

In addition to this, an electrically reliable joint between conductor bar and short-circuiting disc is obtained by virtue of a full-surface low-resistance electrically conductive connection.

In this case, the diffusion and material-fit connection/contacting in the projection only occurs where the clearance between the coating on the conductor bar and the inner side of the recess is comparatively small, i.e. 0.1 mm or less. It is essential in this case that the mechanical axial joining of the short-circuiting discs onto the projections of the conductor bars also takes place more or less cold, without any need to apply significant deformation work in the so-called cold state. The temperature should be less than 50° C. in this case, or 100° C. at most.

This can be further assisted if the ends of the conductor bars are so formed as to be chamfered or conical.

It is also important for the required contact areas between projections of the conductor bars and surfaces of the respective recesses to be embodied as a specifiable range of 30% to 100% of the maximum possible contact areas.

The contact area is derived from e.g. the length of the clearance fit of the recesses in the peripheral direction multiplied by the insertion depths of the conductor bars in the short-circuiting disc.

This depends inter alia on the intended efficiency class of the motor.

The coating of the third material, preferably comprising tin, is also designed thus to be comparatively thin since, by virtue of the residual stress, this material does not drip when heated, in particular during hot-forming, and therefore does not separate from the surface of the projection to be contacted.

The inventive idea can also be implemented in squirrel-cage rotors having short-circuiting rings/discs which are arranged at a distance from the laminated core.

Therefore the projection can be axially composed of the distance from the end side of laminated core to the short-circuiting disc, the insertion depth, and the ventilator section.

Insertion depth in this case normally refers to the axial length of the conductor bar in the short-circuiting disc.

Ventilator section in this case refers to the axial length of the conductor bar which extends beyond the short-circuiting disc on that side of the short-circuiting disc which is oriented away from the laminated core.

In the case of short-circuiting rings/discs which are arranged at a distance, all that is needed to set and maintain said required distance during the production is a reusable tool, for example.

Since the conductor bars can slide axially back and forth in the slot to some extent during the production process of the asynchronous rotor, it is also possible within the scope of the invention for an asynchronous rotor with short-circuiting discs abutting the end side to be produced with short-circuiting rings/discs that are arranged at a distance as follows. The conductor bars are inserted into the magnetically conductive body in such a way that a projection occurs on one side only. The short-circuiting disc is placed onto this projection and contacted as described above. Before the cooling starts, the conductor bars with the already formed-on short-circuiting disc are displaced axially within the laminated core along a specifiable distance, thereby resulting in projections on the other side of the laminated core which can then be contacted using a short-circuiting disc likewise.

The melting points of the individual materials:
First material: e.g. Cu 1080° C.,
Second material: e.g. Al 660° C.
Third material: e.g. tin 230° C.

Recrystallization temperature occurs above approximately 40% to 50% of the respective melting temperature. At temperatures higher than this, e.g. higher than 500° C. in the case of Al, undesired large grain formation occurs which impairs the intended material properties.

In the respective production methods, the conductor bars are generally fixed in the magnetically conductive body as a result of the short-circuiting discs cooling after hot-forming and the short-circuiting ring or short-circuiting discs contracting and thereby securely fixing the conductor bars in their respective slots. Temperatures above 400° C. are not normally reached during operation of the machines, and therefore adequate fixing of the conductor bars in the respective slot over the service life is thereby established.

BRIEF DESCRIPTION OF THE DRAWING

The invention and advantageous embodiments thereof are explained in greater detail below with reference to schematically illustrated exemplary embodiments in which:

FIG. 7 shows an illustration of the heating principle,

FIG. 8 shows a schematic illustration of the axial joining,

DETAILED DESCRIPTION OF PREFERRED EMBODIMENTS

Figure 1:
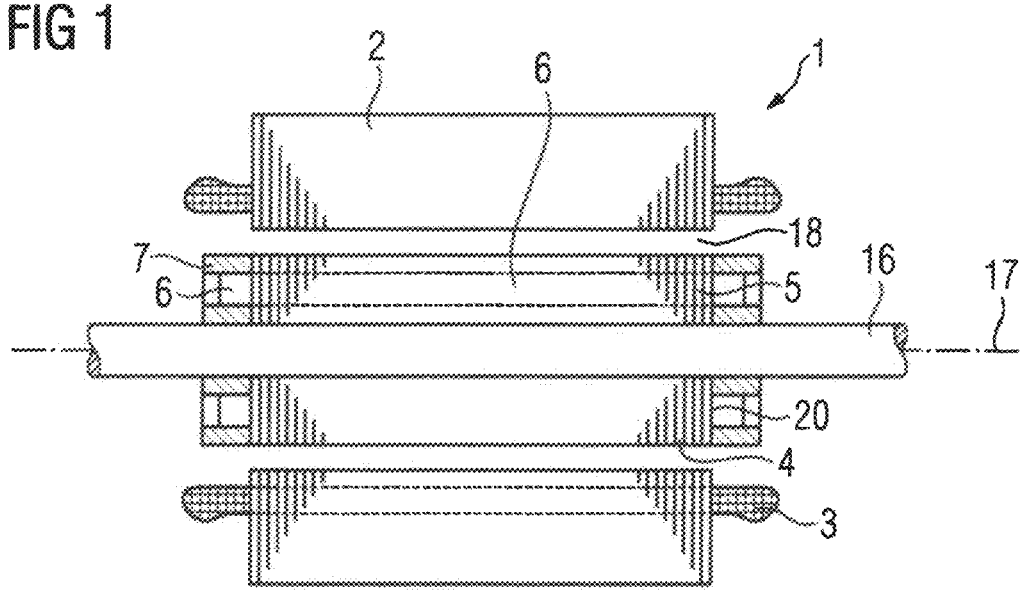
FIG. 1 shows a schematic longitudinal section of an asynchronous machine.

FIG. 1 shows a schematic longitudinal section of an asynchronous machine 1 with a stator 2 forming at its end sides a winding system 3 which has winding overhangs of a winding system 3 there. The winding system 3 in this case can be composed of e.g. chorded coils, former-wound coils or tooth-wound coils having differing or identical coil widths.

A rotor 4 is so arranged as to be separated from the stator 2 by an air gap 18 of said asynchronous machine 1. This squirrel-cage rotor 4 has a magnetically conductive body which is made of sinter material or as a laminated core 5. In the region of its end sides 20 is located at least one short-circuiting ring in each case, in particular a short-circuiting disc 7. The short-circuiting ring, in particular the short-circuiting disc 7, connects and contacts conductor bars 6 which are arranged in slots 8 (not shown) of the laminated core 5.

The short-circuiting ring, in particular the short-circuiting disc 7, is in contact with a shaft 16 in this case as shown in FIG. 1, thereby effecting a thermal interface and hence a cooling of the short-circuiting ring during operation of the asynchronous machine 1. The rotor core is also in contact with the shaft 16 in a rotationally conjoint manner, thereby effecting a thermal interface and hence a cooling likewise.

According to FIG. 1, the short-circuiting ring, in particular the short-circuiting ring disc 7, is in contact with i.e. fits closely against both the end side 20 of the laminated core 5 and the shaft 16.

The short-circuiting disc 7 of the squirrel-cage rotor 4 can be arranged at a distance from the shaft 16 and/or the end side 20.

The short-circuiting ring, in particular a short-circuiting ring disc 7, can therefore be arranged at a distance from the end side 20 of the laminated core 5 and/or from the shaft 16 in order to improve cooling or prevent leakage losses in the laminated core, for example.

As a result of electromagnetic interaction between the stator 2, this being exposed to an electrical current, and a short-circuiting cage of the rotor 4, this comprising the conductor bars 6 and the short-circuiting discs 7, a rotation of the shaft 16 occurs.

During operation of the asynchronous machine 1, the rotor 4 therefore rotates with the rotationally conjoint shaft 16 about an axis of rotation 17.

Figure 2:
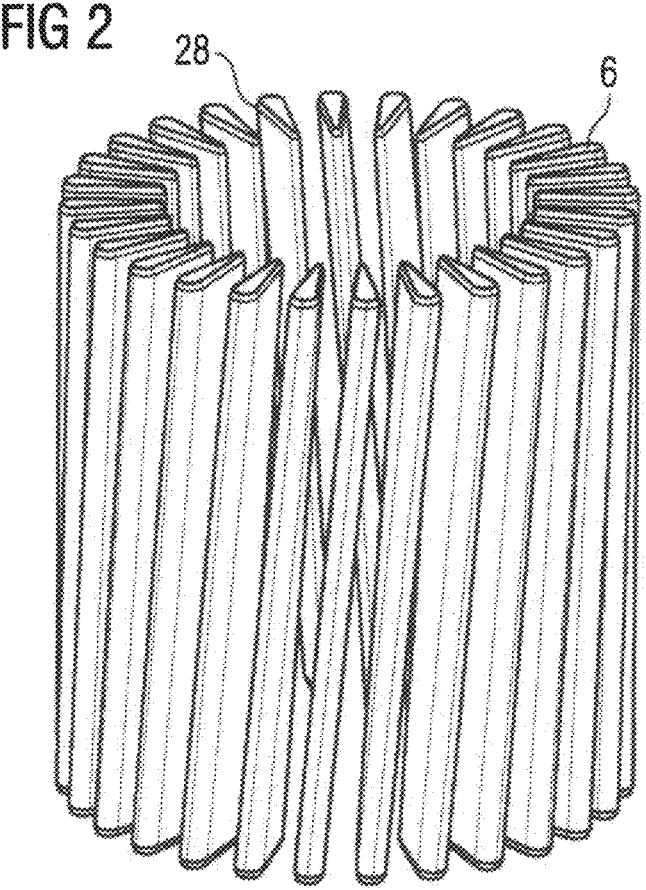
FIG. 2 shows an arrangement of conductor bars.

FIG. 2 shows an arrangement of conductor bars 6 without the magnetically conductive body, i.e. the laminated core 5. The conductor bars 6 are preferably made of drawn copper or a copper alloy and have a drop-shaped cross section. This arrangement also implicitly indicates that the slots 8 are canted along the axial length of the laminated core 5. The cross sectional shape of the conductor bars 6 corresponds substantially to the cross section of the slots 8 in this case. The conductor bars 6 also have a cone 28 which aids axial insertion.

Figure 3:
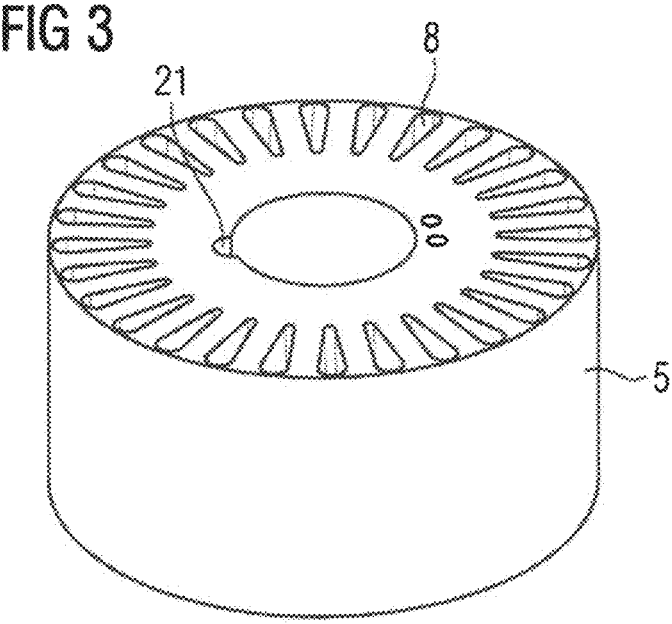
FIG. 3 shows a laminated core of a rotor.

FIG. 3 shows a magnetically conductive body which is embodied as a laminated core 5 of electrical sheet and, in the region of its shaft hole 10, has elements 21 for connecting to the shaft 16 in a rotationally conjoint manner. The slots 8 are arranged in the radially outer region of the laminated core 5 and designed to be peripherally closed. However, they can also be half-open or open in design.

Figure 4:
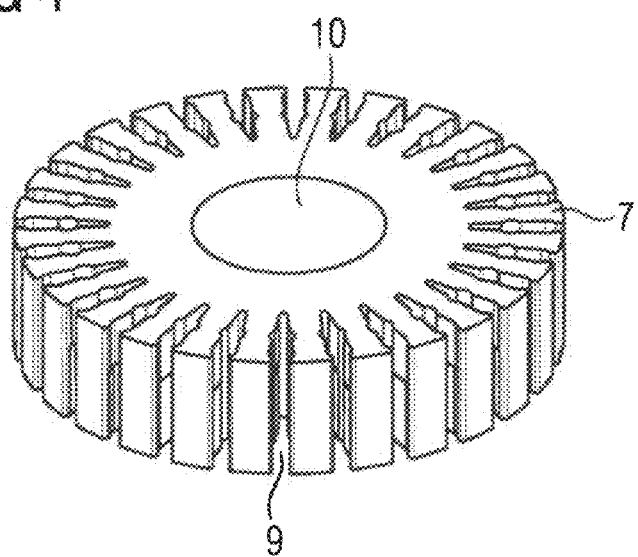
FIG. 4 shows a short-circuiting disc.

FIG. 4 shows a short-circuiting disc 7 which has recesses 9 which are open radially to the outside and correspond to the spacing of the slots 8 of the laminated core 5 in such a way that the conductor bars 6 arranged in the slots 8 can be inserted into said recesses 9. Projections 23 of the conductor bars 6, at least in the region of the recesses 9, preferably form a clearance fit of approximately 0.1 mm to 0.05 mm or even less.

Figure 5:
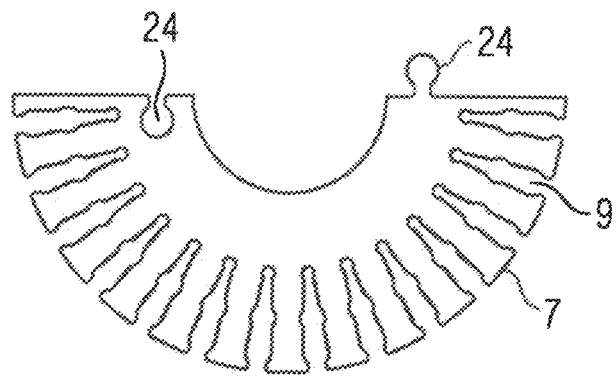
FIG. 5 shows a segmented short-circuiting disc.

In a further embodiment, FIG. 5 shows segments of short-circuiting discs 7 as can be used e.g. for machines having larger shaft heights. Two or more segments as per FIG. 5 form a short-circuiting disc 7, the two segments being mechanically connected at the joining points by a type of dovetail.

In the case of said segmented structure of the short-circuiting discs 7, these are advantageously formed using multiple layers in an axial direction also, such that the joining points 24 are offset in a similar manner to masonry, which ultimately also establishes the electrical connectivity in the short-circuiting ring as a result of axial pressing operations.

Figure 6:
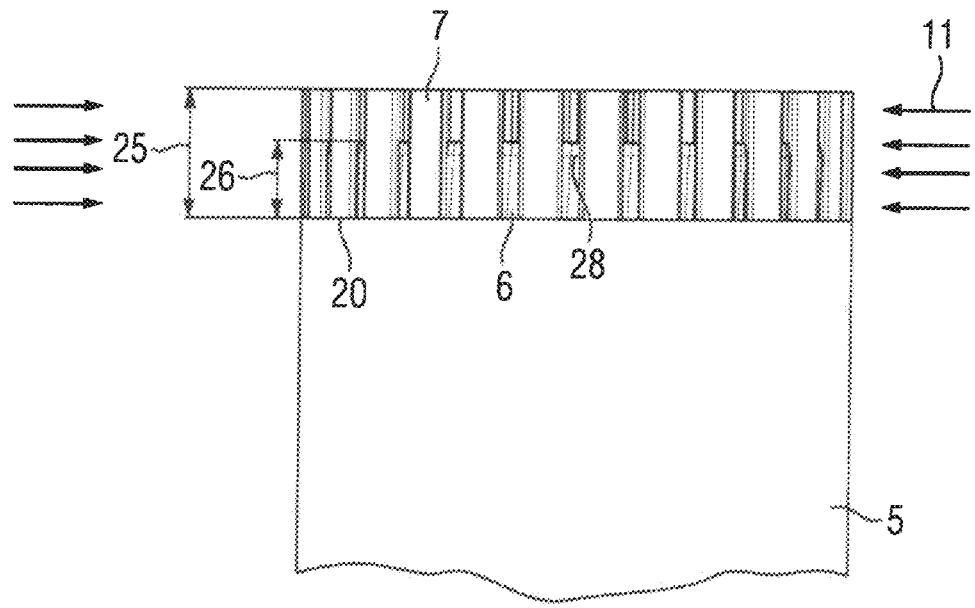
FIG. 6 shows a partial section of the rotor.

FIG. 6 shows the arrangement in the region of the end side 20 during the hot-forming, in particular inductive heating, when the conductor bars 6 are positioned in the laminated core 5 and have been inserted into the short-circuiting discs 7 as a clearance fit with their preferably already coated projections 23.

The heating therefore takes place, preferably by means of a temperature gradient 11 in the heating operation, before the hot-forming or at least for a time during the hot-forming.

A temperature drop occurs starting from that end side 20 of the short-circuiting disc 7 which is oriented towards the laminated core 5 and continuing axially outwards.

In this way, the temperature remains higher in the region of that side of the short-circuiting disc 7 which is oriented towards the laminated core 5, such that the first deformation occurs in the form of an upsetting deformation at the locating face to the coated projection 23 of the conductor bars 6. The further upsetting generates frictional heat which continues axially outwards. It is thereby possible to avoid thermal overload of the material and to effect the deformation in a linear manner axially outwards from the inside.

FIG. 7 shows an exemplary induction arrangement 12 which surrounds the short-circuiting disc 7 in which the coated projections 23 of the conductor bars 6 are arranged and are subjected to the heating process.

By way of example, FIG. 8 shows the joining process when the conductor bars 6 are situated in the laminated core 5. The projections 23 are provided with a coating 15 which is in the range of 2-5 µm. In this case, an insertion depth 26 of the projections 23 into the short-circuiting disc 7 is present which is less than the height 25 of the short-circuiting disc 7. 30% to 100% according to the required contact surface.

The axial joining is preferably performed simultaneously, to a specifiable insertion depth 26, for all conductor bars 6 projecting from an end side 20 of the laminated core 5.

In order to simplify the joining process, the conductor bars 6 are conically shaped or tapered at the conductor bar ends projecting from the laminated core 5 in order to aid the joining process.

Figure 9:
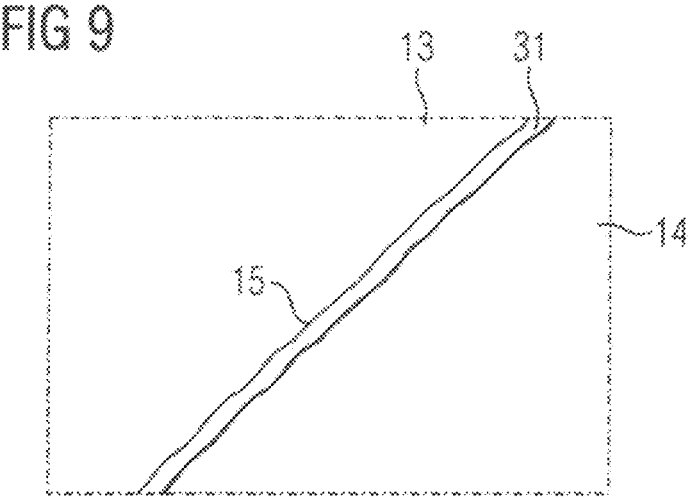
FIG. 9 shows an illustration of the layers of the conductive materials.

FIG. 9 shows a schematic illustration of the coating 15 on the first material 13 at the projection 23 in particular and, separated therefrom by a clearance fit 31, the second material 14. During the heating operation 11, the coating 15 is melted or melted on and ultimately disperses completely or almost completely due to the hot-forming process and the resulting diffusion and/or reflow process and associated alloying.

Figure 10:
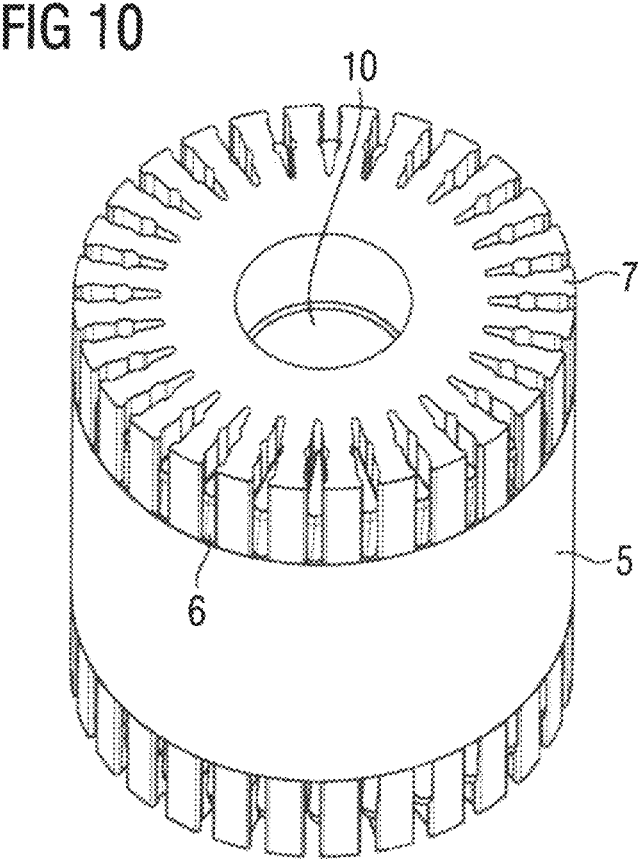
FIG. 10 shows a perspective illustration of the rotor.

FIG. 10 shows a perspective illustration of the rotor core 4 with the conductor bars 6 showing the insertion depth 26 in the short-circuiting disc 7.

Figure 11:
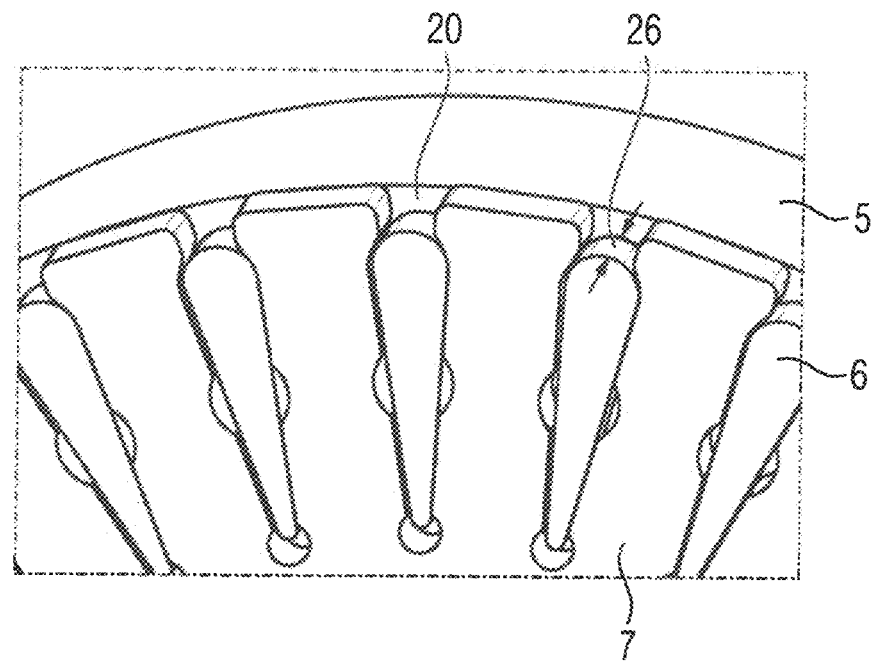
FIG. 11 shows a detail illustration of the finished rotor.

FIG. 11 shows a detail illustration from FIG. 10, in which the recesses 9 of the short-circuiting disc 7 are visibly open radially to the outside.

Figure 12:
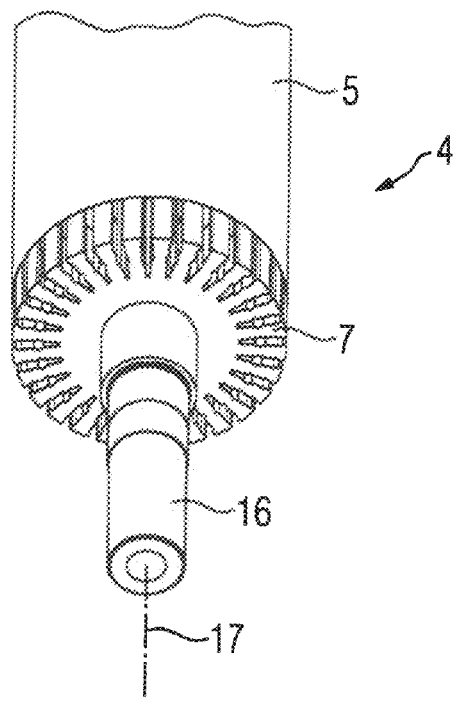
FIG. 12 shows a perspective illustration of the rotor and shaft.

FIG. 12 shows the squirrel-cage rotor 4 connected to the shaft 16 in a rotationally conjoint manner.

However, the shaft 16 can also be connected to the laminated core 5 in a rotationally conjoint manner before the joining operation of conductor bars 6 to the short-circuiting discs 7.

By virtue of the reduced insertion depth 26 relative to the height 25, ventilator-like effects are produced during operation of the machine.

Likewise, ventilator-like blades can also be developed by extending the conductor bars 6 axially through the short-circuiting disc 7. The projection 23 then extends axially beyond the height 25 of the short-circuiting disc 7.

It is also possible for a plurality of reciprocally isolated short-circuiting rings or short-circuiting discs 7 to be arranged on each end side 20 of the laminated core 5. Short-circuiting cages which are electrically isolated from each other in the rotor 4 reduce the harmonic waves in the air gap 18 of the asynchronous machine 1, particularly if the stator 2 has a winding system 3 with tooth-wound coils, wherein each tooth of the stator 2 is surrounded by a tooth-wound coil.

Figure 13:
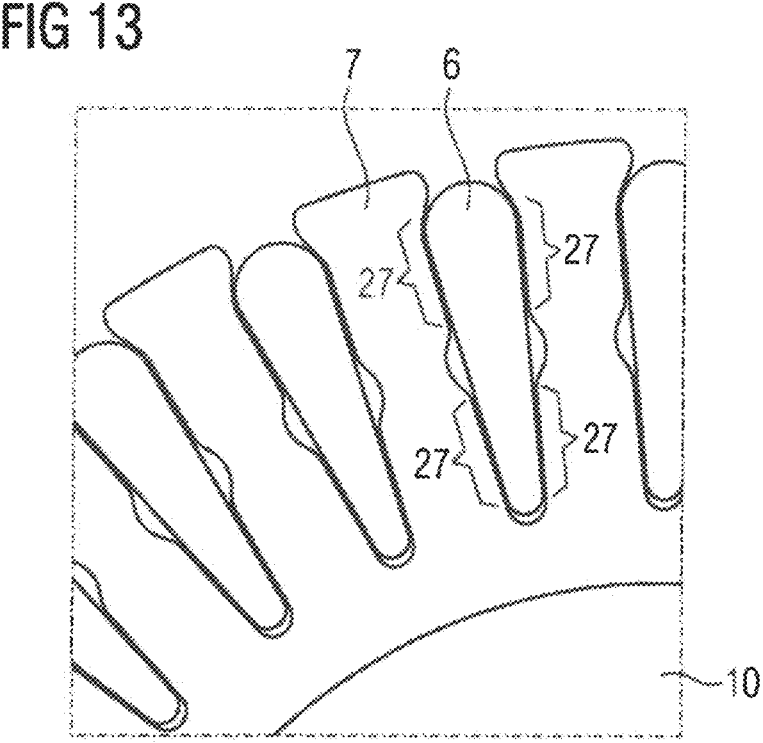
FIG. 13 shows a detail view of the contacting of conductor bar and short-circuiting disc.

FIG. 13 shows a detail illustration of the contact areas 27 between conductor bar 6 and short-circuiting disc 7. In this case, the alloying preferably occurs only at the contact areas 27 which have the clearance fit 31 at the beginning of the production process. The process of the hot-forming can be implemented particularly effectively there. The further openings between conductor bar 6 and short-circuiting disc 7 can inter alia assist the cooling.

The contact area 27 of a conductor bar 6 in a recess 9 is derived from e.g. the peripheral length of the clearance fit 31 in the recess 9 multiplied by the insertion depth 26 of the conductor bar 6 in the short-circuiting disc 7.

Figure 14:
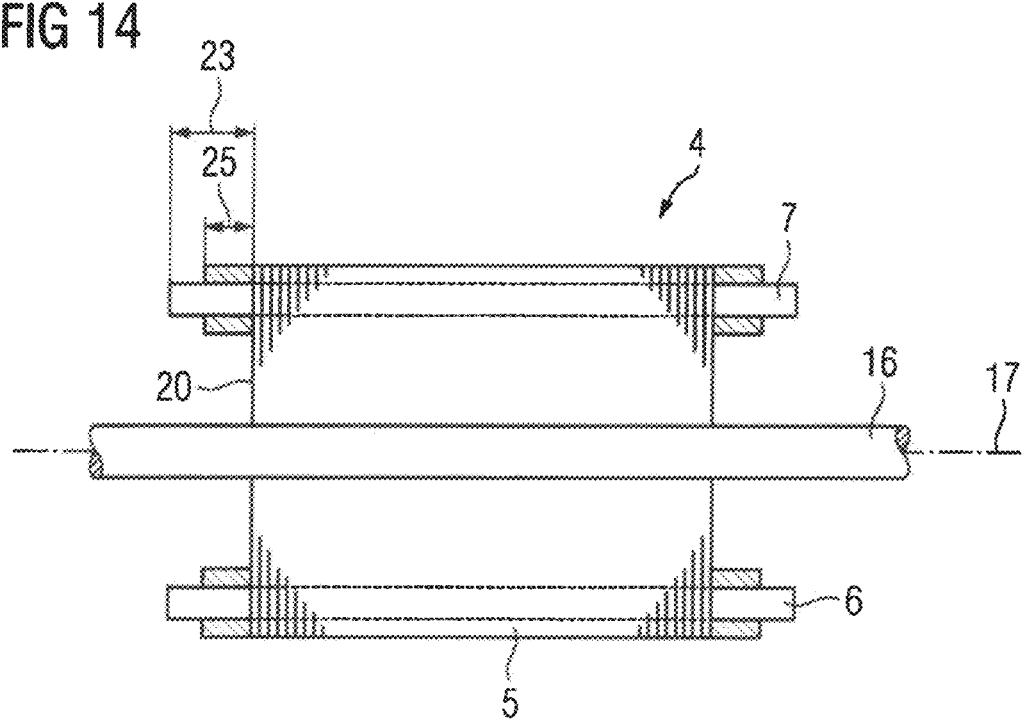
FIG. 14 shows a squirrel-cage rotor with long conductor bars.

FIG. 14 shows a squirrel-cage rotor 4 whose conductor bars 6 project axially beyond the short-circuiting disc 7 and thus form ventilator blades. Furthermore, the short-circuiting disc 7 is not in direct contact with the shaft 16 (as in FIG. 1), but abuts the end side 20 of the laminated core 5.

Figure 15:
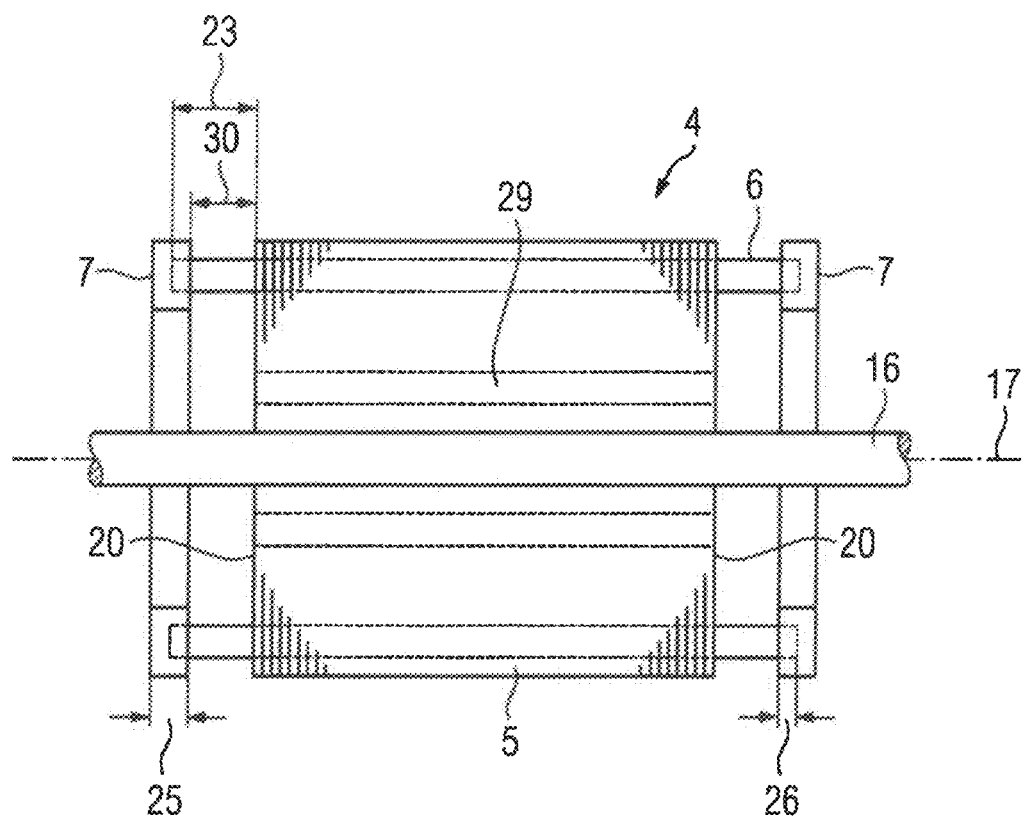
FIG. 15 shows a squirrel-cage rotor with short-circuiting disc arranged at a distance.

FIG. 15 shows a squirrel-cage rotor 4 whose short-circuiting disc 7 or short-circuiting ring is arranged at a distance from the end side 20 of the laminated core 5. This allows cooling via axial cooling channels 29 in the laminated core 5.

A method according to the invention for producing a squirrel-cage rotor 4 or an asynchronous rotor comprising a cage rotor of an asynchronous machine 1 is therefore effected, in consideration of the relationships described above, by means of the following steps:

A substantially cylindrically shaped magnetically conductive body is provided, in particular a laminated rotor core 5, which has substantially axially running slots 14. The laminated core is constructed from axially layered electrical sheets. The slots 14 are closed, half-open or open in the peripheral direction.

The conductor bars 6 are then inserted, preferably axially, into the slots 14. The conductor bars 6 are composed of a first conductive material 13, in particular drawn copper. The conductor bars 6 are inserted in such a way that they project out of the end sides 20 of the magnetically conductive body, in particular the laminated rotor core 5, and thereby form at least one projection 23 on one side, in particular a projection on both sides in each case. The complete conductor bars 6 but at least those sections of the projections 23 which are subsequently contacted with the short-circuiting discs 7 are coated before insertion, preferably with tin. The coating is between 2 µm and 5 µm in this case. The cross section of the conductor bars 6 corresponds substantially to the cross section of the slots 14. Therefore no significant friction occurs between conductor bar 6 and inner side of the slot 14 during the insertion.

The short-circuiting disc 7 composed of a second conductive material 14, in particular aluminum, with recesses which are open radially to the outside 9, is also provided. The recesses 9 can also be closed, half-open or open. Said short-circuiting disc 7 can be constructed from multiple parts axially and/or circumferentially. It can therefore be either segmented circumferentially and/or layered axially. The parts are connected together beforehand in this case. The short-circuiting disc 7 is however preferably composed of a single part which has been cut from an extruded profile 19 and consequently has the required height 25.

The short-circuiting disc 7 is then positioned axially on the projection or projections of the respective conductor bars 6, with a maximum clearance fit of 0.1 mm, which project out of the end side 20 of the magnetically conductive body, in particular the laminated rotor core 5. This takes place by means of cold joining, wherein no significant friction or indeed deformation of conductor bar 6 or recess 9 of the short-circuiting disc 7 occurs.

The subsequent heating of the short-circuiting disc 7 can be effected by means of an inductor or in a furnace. Using the inductor, it is possible selectively to heat the short-circuiting disc to 450° C. to 500° C. within approximately 30 s depending on the short-circuiting disc. Optional screening of the inductor in the direction of the laminated rotor core 5 prevents any unnecessary heating of the laminations at the end side 20.

The press is used to effect hot-forming, under pressure, of the short-circuiting disc 7 onto the projections 23 for approximately one minute, depending on process parameters such as materials used, size of the squirrel-cage rotor 4, etc. An almost simultaneous contacting of the conductor bars 6 with at least specifiable sections of the short-circuiting disc 7 is effected in this case. The clearance fit is "closed down" in this way and electrical contacting is effected in those sections where the clearance fit was present between recess 9 and coated projection 23. The gaps which initially exist at least between projection and recesses of the short-circuiting discs (clearance fit) in the case of cold joining (temperature range between room temperature and max. 100° C.) are no longer present after this process. With cold joining, almost no friction and/or deformation occurs between the conductor bars 6 and the short-circuiting discs 7. The hot-forming causes at least the gaps of the clearance fit to close. As a result of the heating, in particular the hot-forming temperatures, there also occurs a reflow process of the coating 15 to the short-circuiting disc 7. The coating 15 composed of the third material, in particular tin, disperses completely. The coating material, in particular tin, diffuses into the surfaces in the region of the specifiable section of the projection 23 of the conductor bar 6 and the surface that is to be contacted in the recess 9 of the short-circuiting disc 7. Therefore the desired contacting occurs only where the clearance fit was present between projection 23 and recess 9, i.e. the desired contact area.

The complete dispersal of this coating 15 during the production process (diffusion) in the region of the contact areas 27 is essential for the quality of the contacting between conductor bar 6 and short-circuiting disc 7. As a result of the complete dispersal, accumulations of the coating material are no longer present in the gap. In the case of specific materials such as e.g. tin, when running the asynchronous machine in a temperature range of approximately −40° C. to 200° C., unwanted transformations of beta tin into alpha tin or gamma tin would otherwise occur as explained previously. This would result in tin grain with a comparatively poor electrical conductance. The contacting between conductor bar 6 and short-circuiting disc 7 would then be comparatively poor, and this would lead to unnecessary thermal increases during operation of the asynchronous machine 1 and to diminished efficiency.

As a result of this diffusion and alloying, in particular of the tin into the first and second conductive materials of conductor bar 6 and short-circuiting disc 7, e.g. copper and aluminum or alloys thereof, the previously described phase transformation of the coating material is prevented.

By virtue of the reflow and diffusion processes, a material-fit connection between conductor bars 6 and short-circuiting disc 7 is achieved without the application of current as used in the production of a squirrel-cage rotor by means of resistance welding.

In addition to the inter alia electrical connection that is produced by forming, an additional material-fit connection is also obtained by means of diffusion.

Asynchronous machines with a squirrel-cage rotor 4 that is produced according to the invention have a stator into the stator hole of which is inserted the squirrel-cage rotor 4. The shaft 16 to which the squirrel-cage rotor 4 is connected in a rotationally conjoint manner is mounted in a housing on one side or on both sides.

Machines produced according to the invention have a broad spectrum of use and are used inter alia for both standard and high-speed applications, e.g. in the field of compressors, ventilators and pumps, materials handling, machine tool engineering, the food industry, and drives in rail-borne and non-rail-borne vehicle engineering.

These machines can be produced reliably, efficiently and easily. They can also be used for further drive requirements.

What is claimed is:

1. A method for producing a squirrel-cage rotor of an asynchronous machine, said method comprising:
    inserting conductor bars of a first conductive material into substantially axially running slots of a substantially cylindrically shaped magnetically conductive body, such that the conductor bars project out of at least one end side of the magnetically conductive body to form a projection;
    axially positioning by cold joining a short-circuiting disc of a second conductive material under pressure on the projection of the conductor bars to form a contact area between the projection and the short-circuiting disc such that the projection has a clearance fit of approximately 0.1 mm or less relative to a radially outwardly open recess of the short-circuiting disc with gaps which initially exist at least between the projection and recesses of the short-circuiting discs;
    heating, by hot-forming, the short-circuiting disc while the conductor bars almost simultaneously contact the short-circuiting disc, thereby causing the gaps to close; and
    coating at least the projection of the conductor bars with a third material at a layer thickness to form an alloy at the contact area with the first and second materials after heating by hot forming so that the third material is fully dispersed in the first and second materials as a result of the third material being diffused into the first and second materials.

2. The method of claim 1, wherein the conductor bars project out of both end sides of the magnetically conductive body to form projections, respectively.

3. The method of claim 1, wherein the conductor bars are coated with the third material.

4. The method of claim 1, wherein the projection of the conductor bars is coated only in a portion which is ultimately located in the short-circuiting disc.

5. The method of claim 1, wherein the layer thickness of the third material on the projection of the conductor bars is between 2 μm and 5 μm.

6. The method of claim 1, further comprising pickling the conductor bars before being coated with the third material.

7. The method of claim 6, wherein the conductor bars are coated immediately after the conductor bars undergo pickling.

8. The method of claim 1, wherein the third material has a melting point which is lower than a melting point of the first material and the second material.

9. The method of claim 1, wherein the first material has a melting point which is higher than a melting point of the second material.

10. The method of claim 1, wherein the short-circuiting disc is heated by induction heating.

11. A method for producing a squirrel-cage rotor of an asynchronous machine, said method comprising:
    inserting conductor bars of a first conductive material into substantially axially running slots of a substantially cylindrically shaped magnetically conductive body, such that the conductor bars project out of at least one end side of the magnetically conductive body to form a projection;
    axially positioning a short-circuiting disc of a second conductive material under pressure on the projection of the conductor bars such that the projection has a clearance fit, of approximately 0.1 mm or less relative to a radially outwardly open recess of the short-circuiting disc;

heating the short-circuiting disc while the conductor bars almost simultaneously contact the short-circuiting disc; and coating at least the projection of the conductor bars with a third material at a layer thickness to form an alloy with the first and second materials after heating so that the third material is fully dispersed in the first and second materials as a result of the third material being diffused into the first and second materials, wherein the short-circuiting disc is heated by induction heating and the induction heating is realized by an inductor to generate a temperature gradient which decreases axially outwards on the short-circuiting disc.

12. The method of claim 11, wherein the temperature gradient is generated by varying a distance of the inductor from the short-circuiting disc and/or by varying a number of windings of the inductor.

13. The method of claim 1, wherein the short-circuiting disc is constructed in a segmented manner circumferentially and/or axially.

14. A method for producing a squirrel-cage rotor of an asynchronous machine, said method comprising:
inserting conductor bars of a first conductive material into substantially axially running slots of a substantially cylindrically shaped magnetically conductive body, such that the conductor bars project out of at least one end side of the magnetically conductive body to form a projection;
axially positioning a short-circuiting disc of a second conductive material under pressure on the projection of the conductor bars such that the projection has a clearance fit, of approximately 0.1 mm or less relative to a radially outwardly open recess of the short-circuiting disc;
heating the short-circuiting disc while the conductor bars almost simultaneously contact the short-circuiting disc; and
coating at least the projection of the conductor bars with a third material at a layer thickness to form an alloy with the first and second materials after heating so that the third material is fully dispersed in the first and second materials as a result of the third material being diffused Into the first and second materials, wherein the conductor bars in a formed state occupy 30% to 70% of a total axial height of the recess of the short-circuiting disc.

15. The method of claim 1, wherein the conductor bars have an additional contour, at least in the projection, in order to establish an additional positive fit with the short-circuiting disc when undergoing hot-forming.

16. The method of claim 1, wherein the first material is copper or a copper alloy, the second material is aluminum or an aluminum alloy, and the third material comprises tin.

17. The method of claim 1, wherein the conductor bars have chamfered ends or are configured to have a cone.

18. The method of claim 1, wherein at least one of the conductor bars is made of drawn electrocopper with a conductance of at least 58 MS/m.

19. A method for producing a squirrel-cage rotor of an asynchronous machine, said method comprising:
inserting conductor bars of a first conductive material into substantially axially running slots of a substantially cylindrically shaped magnetically conductive body, such that the conductor bars project out of at least one end side of the magnetically conductive body to form a projection;
axially positioning a short-circuiting disc of a second conductive material under pressure on the projection of the conductor bars such that the projection has a clearance fit, of approximately 0.1 mm or less relative to a radially outwardly open recess of the short-circuiting disc;
heating the short-circuiting disc while the conductor bars almost simultaneously contact the short-circuiting disc; and
coating at least the projection of the conductor bars with a third material at a layer thickness to form an alloy with the first and second materials after heating so that the third material is fully dispersed in the first and second materials as a result of the third material being diffused Into the first and second materials, wherein the short-circuiting disc is heated such as to increase a proof stress.

20. The method of claim 1, further comprising cutting a disc from an extruded part to produce the short-circuiting disc.

21. An asynchronous machine, comprising a squirrel-cage rotor produced by a method as set forth in claim 1.

22. A drive system comprising an asynchronous machine as set forth in claim 21.

23. The drive system of claim 22, comprising a compressor, conveyor system, machine tool, or vehicle.

24. The method of claim 1, wherein the substantially cylindrically shaped magnetically conductive body comprises a laminated rotor core and the clearance fit comprises a peripheral clearance fit.

25. The method of claim 11, wherein the substantially cylindrically shaped magnetically conductive body comprises a laminated rotor core and the clearance fit comprises a peripheral clearance fit and the heating comprises hot-forming.

26. The method of claim 14, wherein the substantially cylindrically shaped magnetically conductive body comprises a laminated rotor core and the clearance fit comprises a peripheral clearance fit and the heating comprises hot-forming.

27. The method of claim 19, wherein the substantially cylindrically shaped magnetically conductive body comprises a laminated rotor core and the clearance fit comprises a peripheral clearance fit and the heating comprises hot-forming.

* * * * *

UNITED STATES PATENT AND TRADEMARK OFFICE
CERTIFICATE OF CORRECTION

| | | |
|---|---|---|
| PATENT NO. | : 12,395,049 B2 | Page 1 of 1 |
| APPLICATION NO. | : 17/630058 | |
| DATED | : August 19, 2025 | |
| INVENTOR(S) | : Klaus Büttner, Klaus Kirchner and Matthias Warmuth | |

It is certified that error appears in the above-identified patent and that said Letters Patent is hereby corrected as shown below:

On the Title Page

Page 2, Item (56) under FOREIGN PATENT DOCUMENTS:
Replace "CN 204206894 U" with -- CN 204205894 U --;
Replace "JP 2002336669 A" with -- JP 2002335659 A --.

Signed and Sealed this
Thirtieth Day of September, 2025

John A. Squires
*Director of the United States Patent and Trademark Office*